United States Patent
Tiede et al.

[19]

[11] Patent Number: 6,041,582
[45] Date of Patent: Mar. 28, 2000

[54] SYSTEM FOR RECORDING SOIL CONDITIONS

[75] Inventors: Duane D. Tiede, Naperville; William L. Schubert, Downers Grove, both of Ill.

[73] Assignee: Case Corporation, Racine, Wis.

[21] Appl. No.: 09/027,158

[22] Filed: Feb. 20, 1998

[51] Int. Cl.[7] .................................................. A01D 44/12
[52] U.S. Cl. ...................................................... 56/10.2 A
[58] Field of Search ........................... 56/10.2 A, 10.2 C, 56/10.2 E, 10.2 F, DIG. 1, DIG. 15; 172/1, 2, 3, 4, 4.5, 7

[56] References Cited

U.S. PATENT DOCUMENTS

| | | | |
|---|---|---|---|
| 4,273,056 | 6/1981 | Lofgren et al. | 111/102 |
| 5,044,756 | 9/1991 | Gaultney et al. | 356/446 |
| 5,709,271 | 1/1998 | Bassett | 172/4 |

OTHER PUBLICATIONS

*Modern Agriculture*—Oct./Nov. 1997; pp. 16–18; Soil Compaction Sensor.

*Primary Examiner*—Robert E. Pezzuto
*Attorney, Agent, or Firm*—Foley & Lardner

[57] ABSTRACT

A site-specific farming system for performing work on an agricultural field while soil compaction conditions of the field are being recorded includes a vehicle such as a tractor equipped with an element carrying farming tools for working the field, such as a plow. Sensors, including hitch load pins and/or strain gauge type sensors, detect the load on the tools due to the soil compaction. A location signal generation circuit generates signals relating to the location at which the force signal is sampled. The force data is correlated with the locations at which the force was sampled. The correlated data is stored in a memory. The user interface may include re-definable switches. A display may show a field map including the soil condition values, including soil compaction, and other sensed data.

26 Claims, 14 Drawing Sheets

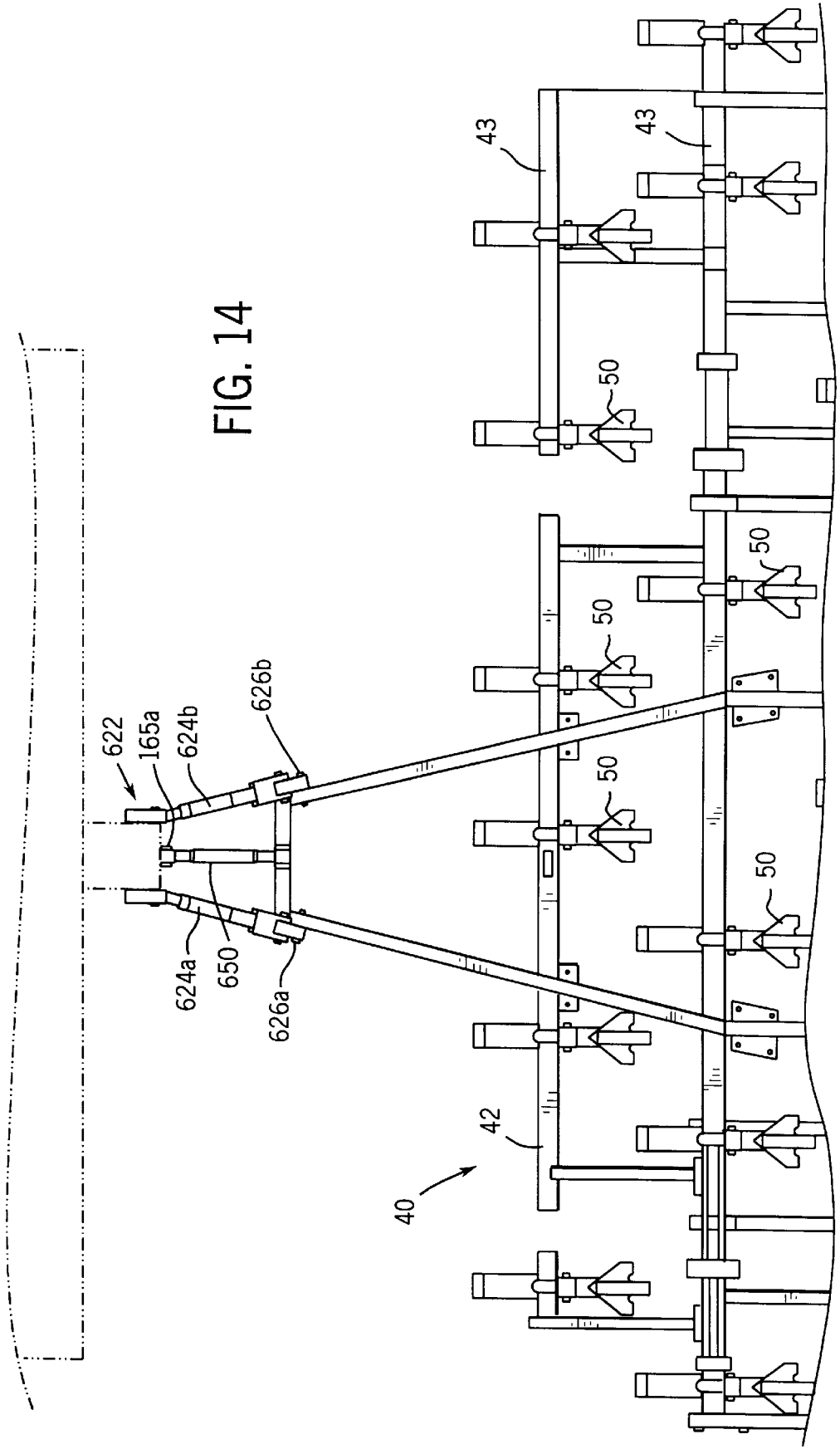

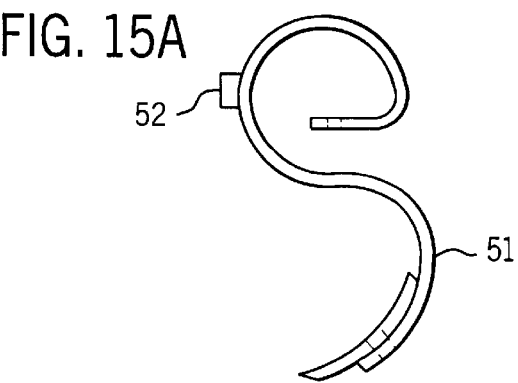
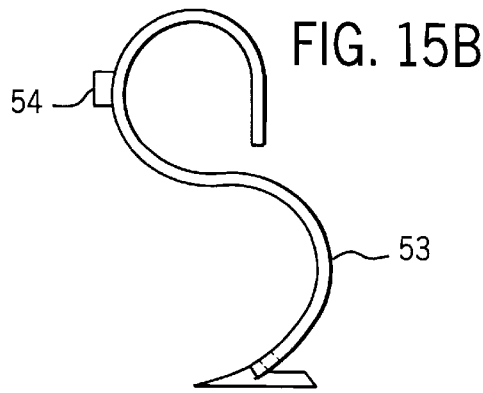
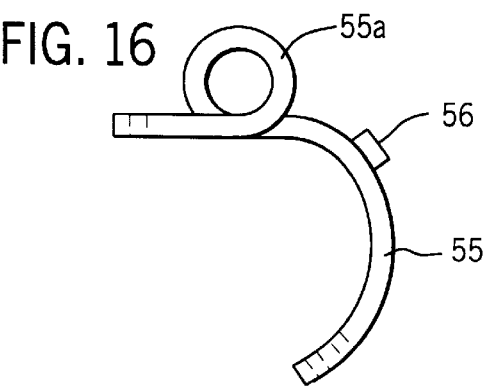
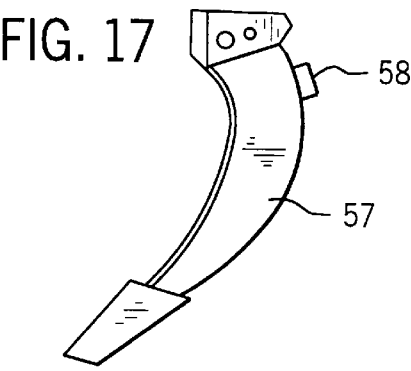
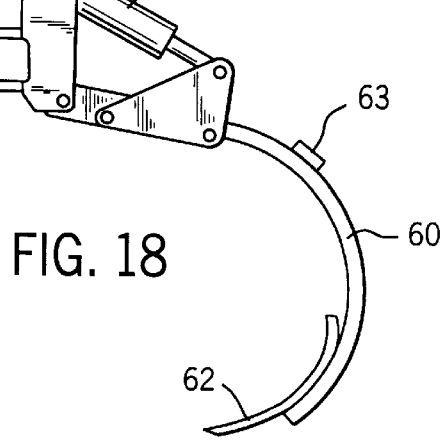
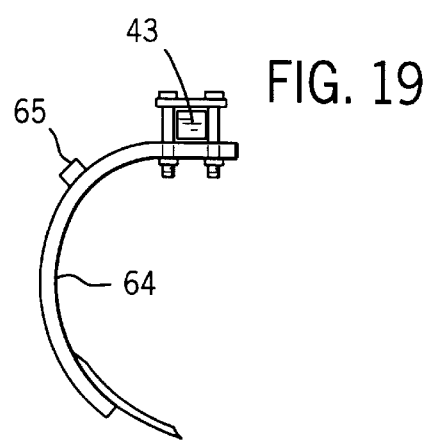

SYSTEM FOR RECORDING SOIL CONDITIONS

FIELD OF THE INVENTION

The present invention relates to a system for recording soil conditions in an agricultural field. In particular, the invention relates to a site-specific farming system mounted on an agricultural vehicle for recording soil conditions at a plurality of locations throughout an agricultural field while the field is being worked and using a device for sensing force exerted on an implement coupled to a work vehicle. Further, the system includes a device for sensing and recording the location of the vehicle in the field, to effect a correlation between this force exerted on an implement and the location where the force was applied.

BACKGROUND OF THE INVENTION

Research within the agricultural community has shown that management of crop production may be optimized by taking into account spatial variations that often exist within a given farming field. For example, by varying the farm inputs applied to a field according to local conditions within the field, a farmer can optimize crop yield as a function of the inputs being applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map (e.g., global information systems (GIS) type database) including desired application or control rates of a farming input. A control system reads data from the prescription map and generates a control signal which is applied to a variable-rate controller for applying a farming input to the field at a rate that varies as a function of the location. Variable-rate controllers may be mounted on agricultural vehicles with attached variable-rate applicators, and may be used to control application rates for plowing; applying seed, fertilizer, insecticides, herbicides; or supplying other inputs. The effect of the inputs may be analyzed by gathering site-specific soil compaction, yield, and moisture content data and correlating this data with farming inputs, thereby allowing a user to optimize the amounts and combinations of farming inputs applied to the field.

The spatially-variable characteristic data may be obtained by manual measuring, remote sensing, or sensing during field operations. Manual measurements typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, can be difficult to correlate with a precise location in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction, topography or altitude), crop properties (e.g., height, moisture content or yield), and farming inputs applied to the field (e.g., fertilizers, herbicides, insecticides, seeds, cultural practices or tillage parameters and techniques used). As these examples show, characteristics which correlate to a specific location include data related to local conditions of the field, farming inputs applied to the field, and crops harvested from the yield.

Logging spatially-variable characteristic data may be accomplished in several ways. A farmer may walk or drive a vehicle through a field and take measurements at a plurality of locations in the field. These measurements are manually recorded. Locations of the measurement sites may be determined by reference to a map of the field, or from an electronic positioning unit. This technique, however, produces data which is difficult to integrate into an electronic site-specific farming system since the recorded data must be manually transferred to a site-specific farming database. Further, a large sampling of measurements must be made to obtain a significant sample population.

Obtaining spatially-variable characteristic data could be performed using a recording system which correlates location data received by an electronic positioning unit with soil condition data manually entered into the recording system. The system could automatically store the correlated location data and element data into a site-specific database. Such a system, however, would be disadvantageous because it would require data logging to be performed separately from working the field. Logging data separately from harvesting the field or applying farming inputs to the field wastes time, increases fuel costs, increases wear and tear on the vehicle used for data logging, and prevents recording soil condition data concurrent with the time that the field is being worked.

In connection with the real time and concurrent data recording as the field is being worked, and in accordance with the invention, the loads exhibited on the field working tools as well as between the vehicle and implement may be recorded. Typically the resistance of the ground will vary depending on such factors as the hardness of the ground, its material consistency, the depth of penetration of the implement and so forth. Various systems are known for coupling implements to work vehicles such as agricultural tractors. One such system is the three-point hitch commonly found on a variety of off road vehicles, including agricultural tractors, construction tractors, back hoes and the like. In such vehicles, it is generally known that the force or draft load exerted on the hitch.

SUMMARY OF THE INVENTION

The present invention provides a system for recording soil conditions of an agricultural field while work is being performed on the field. The system includes a vehicle that moves over a field and has an agricultural tool, moved by the vehicle, and configured to perform work on the field as the vehicle moves over the field. The system also includes an input device supported by the vehicle and configured to generate force signals representative of the force applied by the soil to the tool. The system further includes a location signal generation circuit supported by the vehicle and configured to receive location signals and to generate location signals therefrom. Coupled to the input device is a control element and the location signal generation circuit. The control element is configured to generate condition data representative of the soil conditions based upon the force signals, and to process the location signals to generate location data representative of the corresponding location of the vehicle in the field. The data is stored in a digital memory coupled to the control circuit. The control element is further configured to correlate the condition data with the respective location data, and to store the condition data with the correlated location data in the digital memory.

The present invention also relates to an apparatus for recording soil conditions of an agricultural field while work is being performed on the field. The apparatus includes a vehicle moveable over the field and a hitch, for attachment of a ground-engaging implement. The hitch includes at least one link arm, having a first end and a second end, with the first end attached to the rear of the tractor, and with the second end attached to the ground-engaging implement, and at least one load pin configured to generate a force signal representative of the force applied thereto. The apparatus also includes a location signal generation circuit supported by the vehicle and configured to receive and generate location signals and location signals therefrom. A control circuit is coupled to the input device, and the location signal generation circuit, the control circuit being configured to generate condition data representative of the soil conditions derived from the force signals, and to process the location signals to generate location data representative of the corresponding location of the vehicle in the field. A digital memory is coupled to the control circuit, the control circuit being further configured to correlate the condition data with the respective location data, and to store the condition data with the correlated location data in the digital memory.

The invention also provides a method of recording soil conditions in an agricultural field while work is being performed on the field by a tool supported by a vehicle moving over the field. The method includes the steps of generating force data representative of soil conditions located at a plurality of locations within the field, receiving location signals, processing the location signals to generate location data representative of the plurality of locations, correlating the respective condition data with the respective location data, and storing the condition data with the correlated location data.

BRIEF DESCRIPTION OF THE DRAWINGS

Other advantages of the invention will become more fully understood from the following specification and claims taken in conjunction with the accompanying drawings in which:

FIG. 14 is a fragmentary schematic view in plan of the implement and a typical three point hitch with load measuring devices at typical locations to measure the force required to pull the implement across the field, with, for example, tools of the implement in engagement with the soil of the field;

FIGS. 15–19 illustrate various tool forms which may be utilized with the implement illustrated in FIGS. 1 and 14, including sensors mounted thereon for measuring the force encountered during tillage operations.

DETAILED DESCRIPTION OF THE PREFERRED EMBODIMENT

Figure 1:
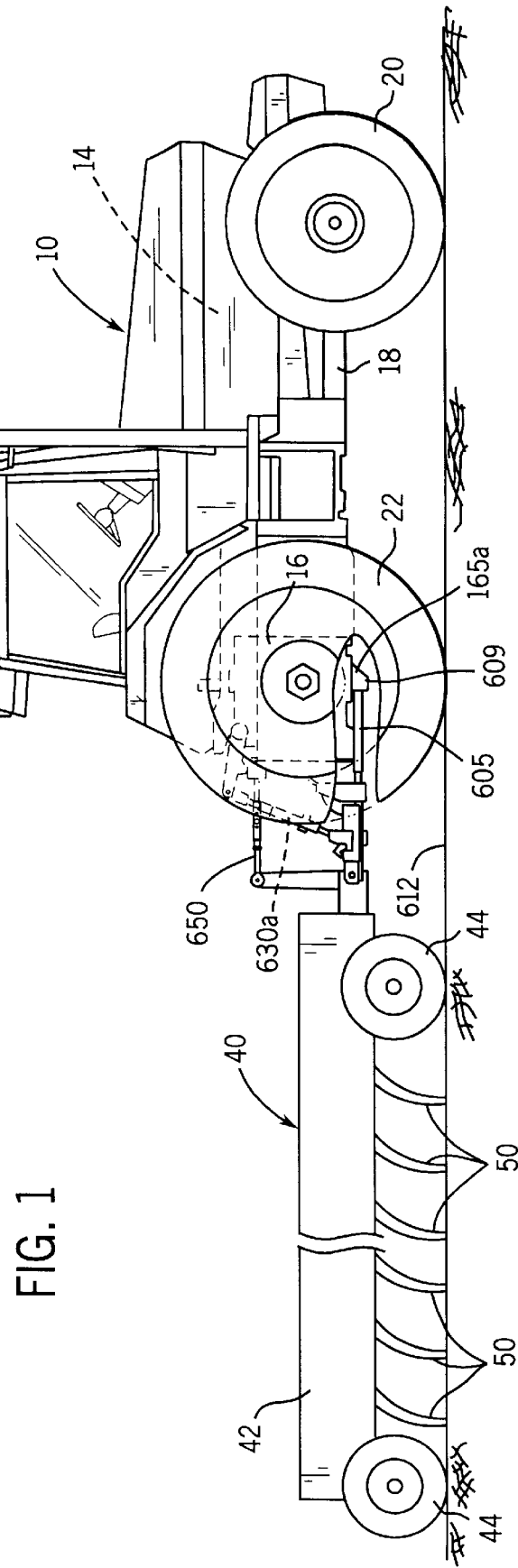
FIG. 1 is a schematic view of a farm vehicle with an exemplary towed implement, including apparatus for determining the load on the implement during ground engagement of the tools.
Figure 12:
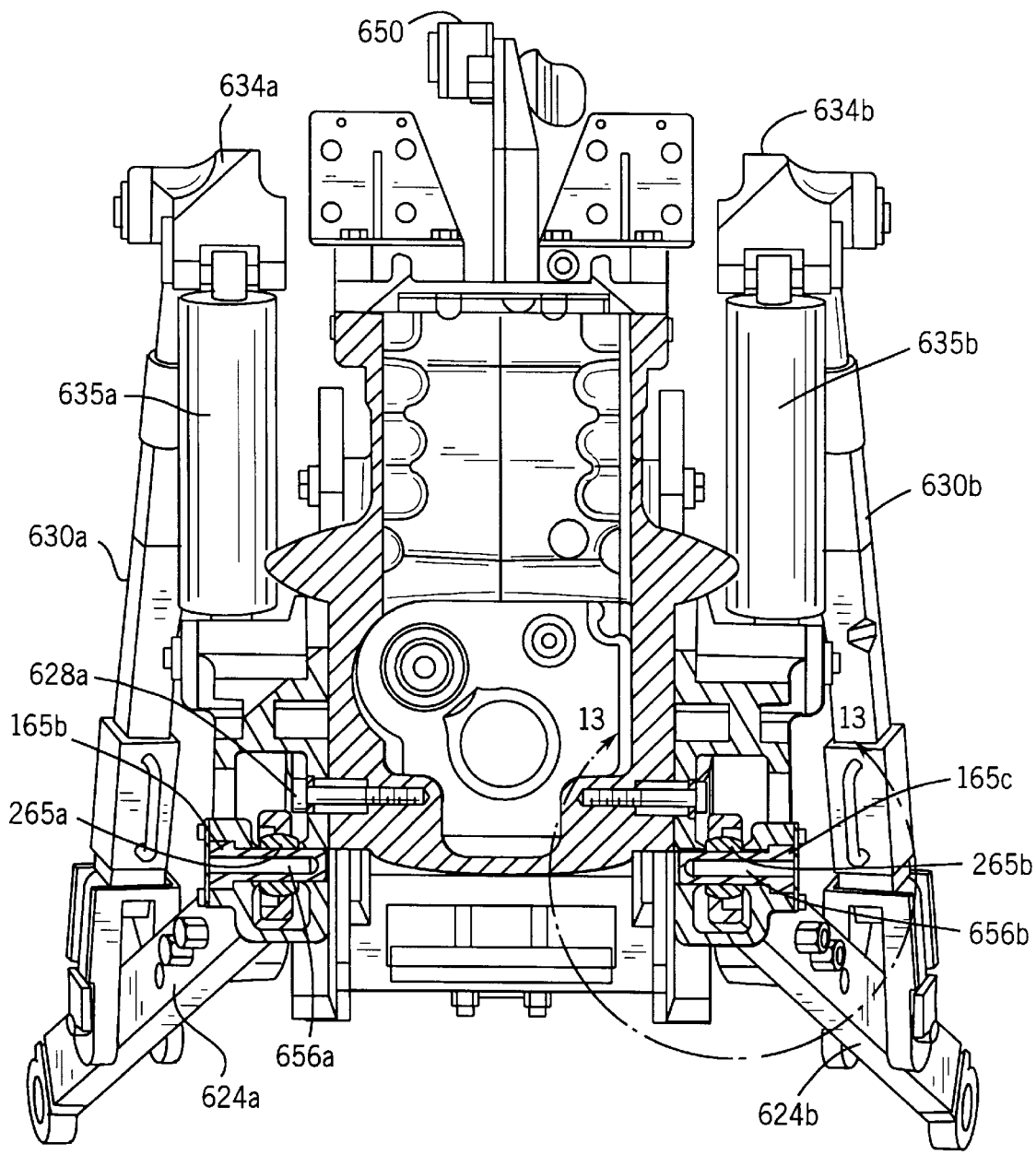
FIG. 12 is an enlarged, fragmentary cross-sectional view taken along line 12—12 of FIG. 7.

Turning now to the drawings, and especially FIG. 1 thereof, although the system of the present invention and the various portions thereof described hereinafter refer to farming implements in general, including those pulled by a tractor or those incorporated in a combine or pulled thereby, by way of example only, a tractor 10, including an operator-controlled cab 12 is shown therein. The tractor 10 includes an engine 14, which bus drive train 16 and 18 is shown coupled to driven front and rear wheels 20 and 22. In the illustrated instance, and as will be more fully explained hereinafter, the tractor 10 is coupled as by a three point hitch 622 or a drawbar 605 to an implement such as a farming implement 40, the implement 40, as shown in FIGS. 1 and 12, includes a frame 42 including ground support wheels 44 and a plurality of tools 50, examples of which are described hereinafter relative to FIGS. 13–17. The tools 50 are laterally spaced apart and attached to laterally adjoining cross-members 43 (FIG. 12) of the frame 42 for ground engagement for working the soil for various farming activities such as soil tillage, cultivation, and the like.

Figure 2:
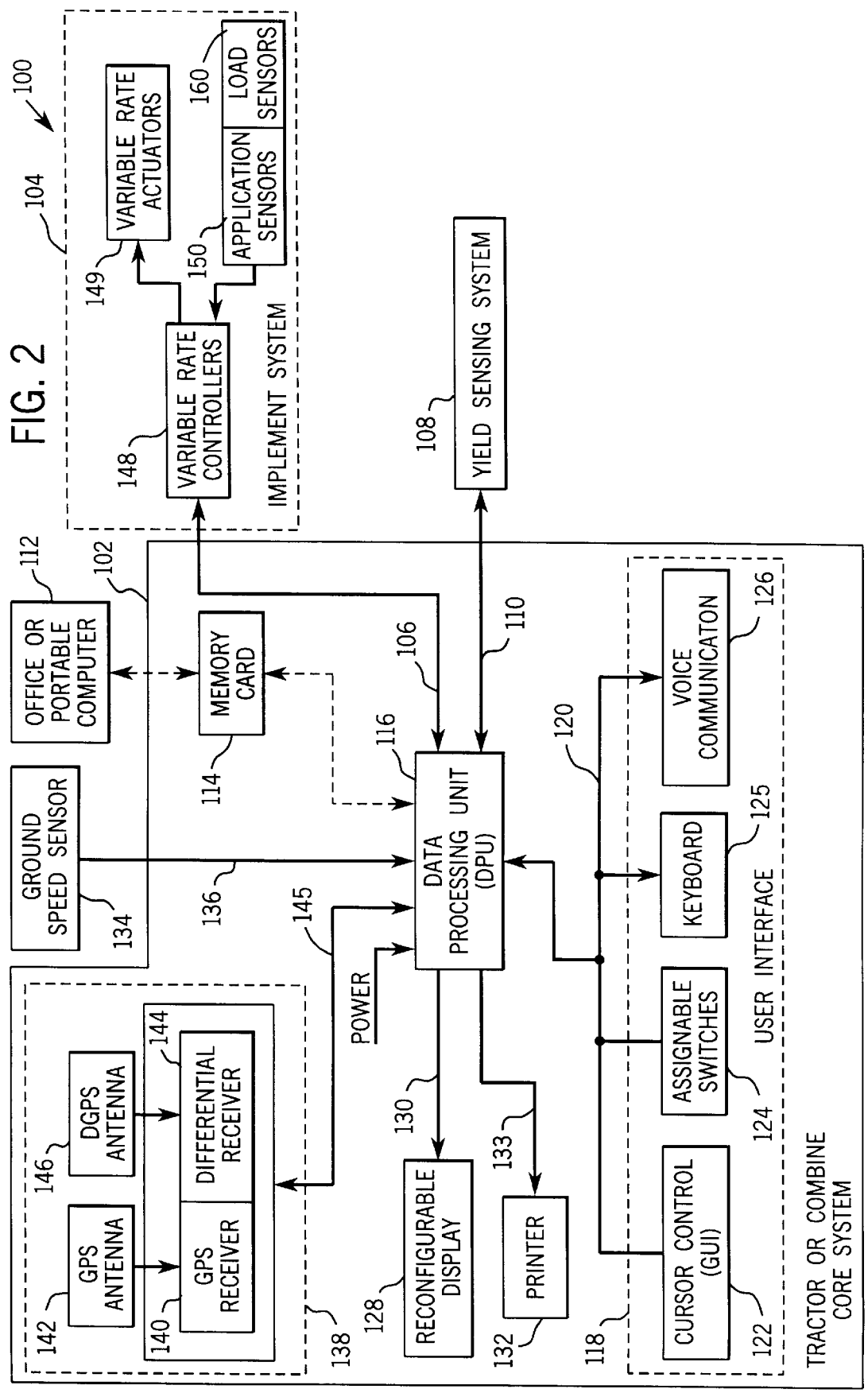
FIG. 2 is a schematic block diagram illustrating a site-specific farming system, including a block representation of a farm vehicle such as illustrated in FIG. 1, and equipped with apparatus for sampling site-specific characteristics of the field, including apparatus for displaying visible indicia of the characteristics for linking the apparatus to external computers and sensors for processing the farming data.

Referring to FIG. 2, a site-specific farming system 100 includes one or more core systems 102 which provide data processing functions for different agricultural vehicles including the example tractor 10 and combines (not shown). In farming system 100, each tractor or combine is equipped with its own core system 102. Each tractor 10 is also equipped with an implement system 104 appropriate for a desired task, e.g., applying fertilizer, seeds, water, etc. As shown, core system 102 of the tractor 10 communicates with implement system 104 over bus 106. If the agricultural vehicle being used is a combine, it may be also equipped with a yield sensing system 108 that communicates with core system 102 over bus 110.

Preferably core system 102 is portable and may be installed on a variety of agricultural vehicles. When installed in a tractor 10 equipped with implement system 104, core system 102 may be configured to operate in an "apply" or a "data collection" mode wherein it collects, controls, records and displays monitored data. The displayed data may include either previously recorded data (e.g., a prescription map) or the actual monitor data (e.g., the sensed feedback). When installed on the tractor 10 equipped with an implement such as the implement 40, with ground engaging tools 50 such as a plow or the like 60, and the tractor 10 is equipped with load sensors 160, for example load pins 165 (a)–(c), that sense the forces applied to the implement 40/or through the tools 50, core system 102 may be configured to operate in the apply or collection mode, for example, for soil compaction data. The "apply and data collection modes" also corresponds with a tractor implement 40 applying field inputs such as plowing. Core system 102 may also provide directional or locational assistance during application of field inputs.

Farming system 100 also may include a work station or computer, in the present instance a personal computer 112 which may be located in an office on the farm or may be portable and carried within the cab of the tractor 10. A communication medium is employed to transfer site-specific data between core system 102 and computer 112. Preferably, the core system 102 and the computer 112 each includes a read-write interface (not shown) for removable memory, such as a card 114, which may be transported between core system 102 and computer 112. Memory cards 114 may be Type II PCMCIA cards made, for example, by Centennial Technologies, Inc. However, other communication mediums such as floppy or hard disks, RF, Infrared, RS232/485 links, etc. may be employed. Memory card 114, for example, may be used to transfer site-specific data from core system 102 to computer 112 and to transfer prescription maps from computer 112 to core system 102.

Core system 102 includes a control element, in the present instance including a digital data processing unit (DPU) 116 which communicates with the vehicle operator through a user interface 118 by way of links 120 (e.g., an RS232/485 interface; a standard keyboard interface, etc.). DPU 116 includes a processor (for example, a 486DX or Pentium® microprocessor) and various types of memory which may include non-volatile memory (Prom, E-Prom or Flash) and volatile memory (RAM). As is conventional, the processor may execute a program stored in non-volatile memory and the volatile memory (RAM) may include a battery back-up circuit to hold portions or all of the programs in high speed memory or hold selected application programs and/or routines, as desired. Alternatively, DPU 116 may be implemented using dedicated, specific purpose logic or hard-wired logic circuitry. Moreover, the DPU and associated functions may be replaced by an enhanced cab display unit (ECDU) sold by Case Manufacturing Company. User interface 118 may include a graphical user interface (GUI) 122 providing cursor control (e.g., a mouse, joy stick or other switch control with cursor and the like movement possibilities), assignable switches 124 (for example, push buttons and the like) configurable by the processor, a keyboard 125 and voice communication interface 126.

DPU 116 is configured to generate display signals which are applied to a reconfigurable display 128 (e.g., a CRT or flat screen LCD display) via communication link 130. Display 128 is preferably an active matrix LCD capable of displaying full-motion video and a number of colors under varying ambient light conditions while also displaying graphics and alpha-numeric characters. Display 128 is used, inter alia, to display the current configurations of assignable switches 124. DPU 116, user interface 118 and display 128 are located in the tractor cab 12 and located so that the operator has easy access to user interface 118 and an unobstructed view of display 128. Core system 102 may also include a printer 132 in the cab which communicates with DPU 116 via an interface 133 (e.g., an RS-232 link).

DPU 116 may receive signals representing the speed of the vehicle from ground speed sensor 134 via interface 136 (e.g., a frequency interface). Ground speed sensor 134 may be of any convenient type and include a magnetic pickup sensor configured to sense the speed of the vehicle's wheels or transmission output, or may include a radar device mounted to the body of the vehicle. The speed signals may be used by DPU 116 to calculate distance travelled as described below.

DPU 116 also communicates with a location signal generation circuit 138 which generates location signals representing the vehicle's location. Circuit 138 includes a global positioning system (GPS) signal receiver 140 with an associated antenna 142, and a differential GPS (DGPS) signal receiver 144 with an associated antenna 146. A single antenna may be used in place of antennas 142 and 146. GPS receiver 140 may, for example, be manufactured by Trimble Navigation Ltd. of California, and DGPS receiver 144 may be manufactured by Satloc, Inc. of Arizona. GPS receiver 140 determines longitude and latitude coordinates (and altitude) of the vehicle from signals transmitted by the GPS satellite network. The accuracy of the location data is improved by applying correction signals received by DGPS receiver 144. The differential correction signals are used to correct errors present on GPS signals including the selective availability error signal added to GPS signals by the U.S. government. DGPS signals are transmitted by the U.S. Coast Guard and by commercial services. For example, the Omnistar DGPS system from John E. Chance & Assoc. of Texas includes a network of ten land-based differential reference stations that send correction signals to a master station which uploads signals to a satellite for broadcast throughout North America. GPS differential correction signals may also be transmitted from a local base station such as the top of a building. In a preferred embodiment, DPU 116 interfaces with SATLOC L-Band Integrated Terra Star DGPS System via an RS-485 communication link 145.

When core system 102 is mounted on a tractor, DPU 116 communicates with implement system 104 by way of bus 106. The implement system may include one or more variable rate controllers 148, variable rate actuators 149 and application sensors 150 which would include load sensors 160. DPU 116 reads application rate data for a particular field location from a prescription map, which is a map giving locations where a prescribed amount of a farming material (e.g., seed, fertilizer, water, etc.) may be supplied to achieve a particular desired farming result. The map may be supplied by the computer 112 or DPU 116 can read an input device which may be employed by the machine operator to manually set a desired material application rate and generate commands which are sent to variable rate controllers 148. The command output rate is a function of the speed of the tractor 10 (or combine) and the desired material application rate. For example, an increased speed will require an increased output rate to maintain a constant desired material application rate. In response, controllers 148 generate control signals which are applied to variable rate actuators 149. Application sensors 150 provide feedback signals representing the actual application rates to enable closed loop control. The bus 106 may be an RS-485 bus for a single channel variable rate controller or an SAJ-1939 implement bus for a multi-channel controller.

The tractor 10 may also include site-specific sensors configured to sense soil conditions of a field during field operations and communicate the information to DPU 116, even if the tractor is not equipped with variable rate controllers. A tractor with a hitch assembly control system with various sensors is described in U.S. Pat. No. 5,421,416, commonly assigned and incorporated herein by reference. A tractor 10 as used herein, may take the form of various agricultural vehicles attached to implements 40, commonly including farming tools and alluded to as planters, spreaders, plows or fertilizing apparatus and systems.

Figure 7:
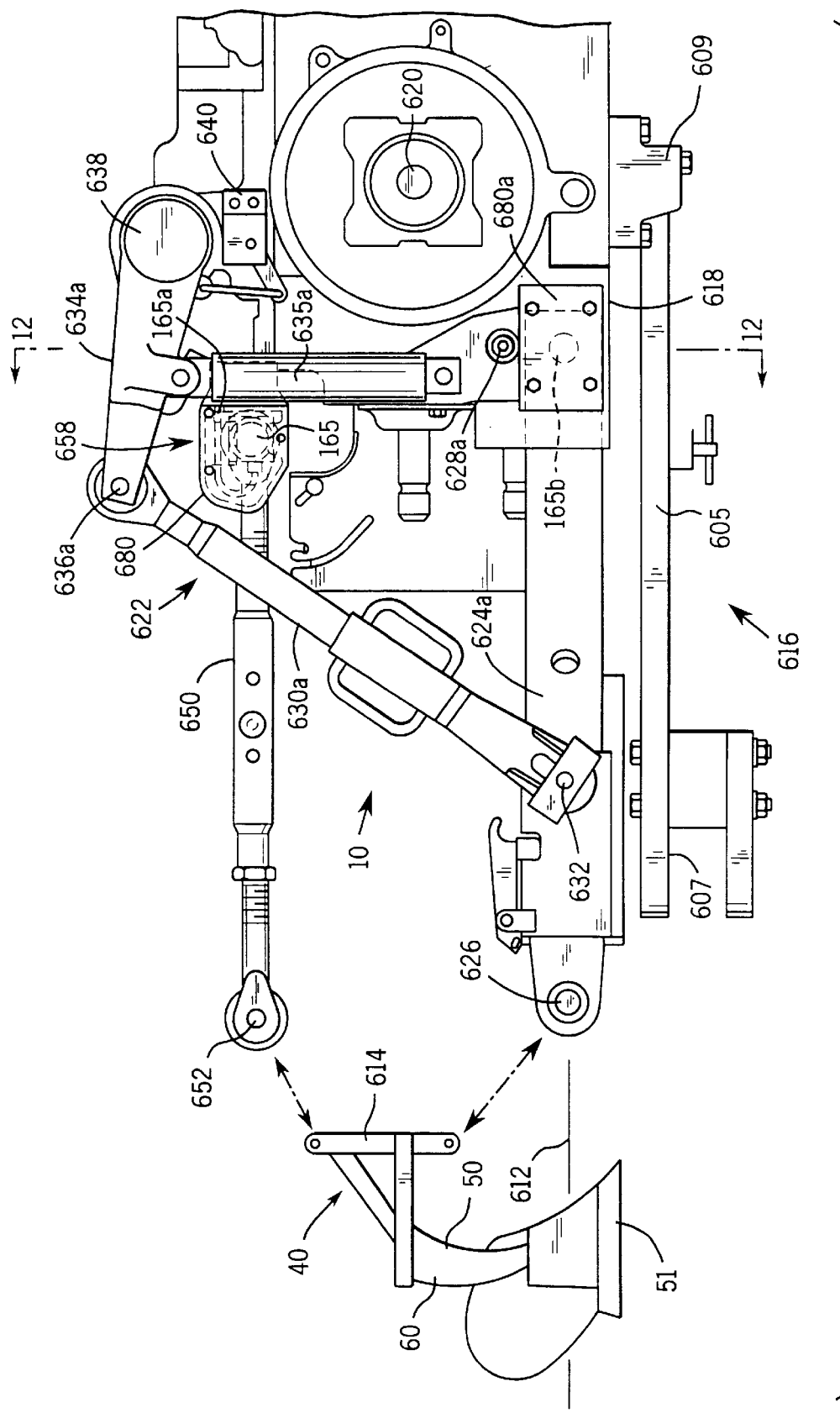
FIG. 7 is an enlarged, fragmentary side elevational view of an implement support assembly illustrated between the implement and the tractor shown in FIG. 1, and illustrating in reduced size a tool of the implement illustrated in FIG. 1.

In accordance with the invention, load signals from load sensors 160 supported by the tractor 10, may be processed by DPU 116 to form data representative of the soil condition such as soil compaction information. Load sensors 160 may be positioned to sense the force applied to tools by the soil, or, as in the instance of one or more load pins 165, sometimes referred to as a draft load or draft force. Draft load or draft force is the load applied to the farming implement 40 by the tractor 10 as it is pulled across the ground with or without the tools 50 in ground engagement. When the tools are not in ground engagement, the force is only that necessary to pull the implement 40. When in engagement, the force is that necessary for the tools 50 to work the ground of the field. Known information about the implement being employed, such as tool geometry, is used to relate the sensed force to soil conditions such as compaction or hardness. This condition data is correlated with location data representative of the location signals received from location signal generation circuit 138 and the correlated data is stored in memory card 114 or another appropriate system memory. A more complete system of preferred sensor position to sense the soil force applied to at least selected, individual tools, as well as the application of load pins for determining overall draft load or draft force, is described hereinafter with respect to FIGS. 7–19. As shall be seen, these sensors 160 may monitor site-specific characteristics, for example, not only draft force but tool location and provide for the mapping of soil compaction as the field is being worked. Turning now to FIGS. 7 and 12, load sensors 160, in the illustrated instance load pins 165 may be installed at locations 165b or 165c (preferably at least two for a three point hitch) or in a single location, 165a (when a single load pin is employed), or even in all three locations for a three point hitch such as the three point hitch 622. Moreover, as will be more fully described hereinafter with reference to FIGS. 15–19, individual tools 50 may include their own load sensors so that soil compaction data or drag force against the individual tools may be plotted or mapped as the implement 40 is being pulled across the field with the tools in ground engagement.

Referring first to load pin 165 at a single load pin location 165a, in FIG. 7, a working tool 50, in the illustrated instance a plow 51 for ground engagement includes an upstanding mast member 614. An associated work vehicle, for example the tractor 10, is attached to implement 40 by way of a three way hitch 622. Connected to the frame 618 of the tractor 10 is a draw bar 605 which permits a simple pulling action by the tractor 10 of implements that may be attached through the clevis terminal end 607 of the draw bar 605. The initial end of the draw bar 605 is connected through suitable support apparatus 609 to the frame 618 of the tractor 10. The hitch assembly 622 includes, in the illustrated instance, a pair of lower arms 624a, 624b (see FIG. 12), a pair of telescoping lift arms 630a, 630b which interconnect the lower arms 624a and 624b with a pair of rock shaft arms 634a, 634b respectively. Rock shaft arms 634a, 634b are driven by pistons within hydraulic cylinders 635a and 635b, respectively. Inasmuch as the telescoping adjustable lift arms 630a, 630b are connected to the rock shaft arms 634a, 634b respectively, energization of the cylinders 635a, 635b will effect raising and lowering of the lower arms 624a, 624b. As illustrated, the arms 624a, 624b are pivotally attached to a bracket which houses the ball 265b and which is connected to the frame 618 of the tractor 10 by pins 628. The extended ends of arms 624a, 624b are also pivotally connected to the mast 614 of implement 40 by an arm interconnector 626, in the illustrated instance, a bracket 626a (FIG. 14). As may be seen in FIG. 7, the telescoping adjustable lift arms 630a, 630b are pivotally connected to arms 624a, 624b by pins 632 and to rock shaft arms 634a, 634b by pins 636a, 636b. As illustrated, the rock shaft arms 634a and 634b are connected to a rock shaft 638, the rock shaft having associated therewith a position sensor assembly 640 which employs a signal generator to generate a signal representative of the position of the rock shaft arms 634 and associated implement 40. The signal is communicated to variable rate controllers 148 shown in FIG. 2. The signal may be employed for active control of the implement 40 by variable rate actuators 149 or the signal may be communicated to DPU 116 where it is stored in memory card 114 to be used as part of a site-specific farming system. The three point hitch 622 also includes an upper link arm 650 which is pivotally connected at one end to the mast 614 of the implement 40 as by a pin 652, the opposite end of the upper link arm 650 being pivotally connected to the vehicle or tractor body or frame 618, in the present instance by a load pin 165. Load pin 165 may be one of a set of load pins forming part of the load sensors 160 in the implement system 104 shown in FIG. 2. As shown best in FIG. 9, load pin 165 is tubular in construction and contains an electronic strain sensor 656 therein.

If a single load pin is to be employed, to effect draft load sensing utilizing a single load pin, the placement of the pin at location 165a (FIG. 7), is to be preferred. However, it is preferable to employ multiple load pins to measure soil conditions, such as compaction, by sensing the force exerted on implement 40 by engagement of its tools such as the plow 51 with a ground 612. Other load pins may be located at pin locations 165b and 165c, (i.e., on and for each of the arms 624b, 624c, FIG. 12). Moreover, if the draw bar is to be the preferred means for attachment of an implement 40, a single load pin may be located in the apparatus 609 which connects the load or draft bar 605 to the frame 618 of the tractor 10. In the illustrated instance, a load pin in both arms 624a, 624b plus the pin 165 at location 165 (*a*) is the preferred location for determining the draft load by the hitch 622. It is recognized that knowing the relative orientations and locations of the load pins allows for sensing of both magnitude and direction of the force being exerted on the implement 40. If two pins are allocated, using a three point hitch, load pins 265 at locations 165b and 165c are preferred.

Because a single load pin 165 may be employed to sense the force exerted on implement 40, the configuration of load pin 165 is detailed below. However, it should be recognized that assemblies similar to the assembly described hereinafter for load pin 165 may be applied similarly to load pins 265 (corresponding to locations 165b and 165c) such that the three load pins located at locations 165a–165c provide three load pins for communication of signals to controllers 148 indicative of the load of the implement 40 being pulled by the tractor 10.

Figure 8:
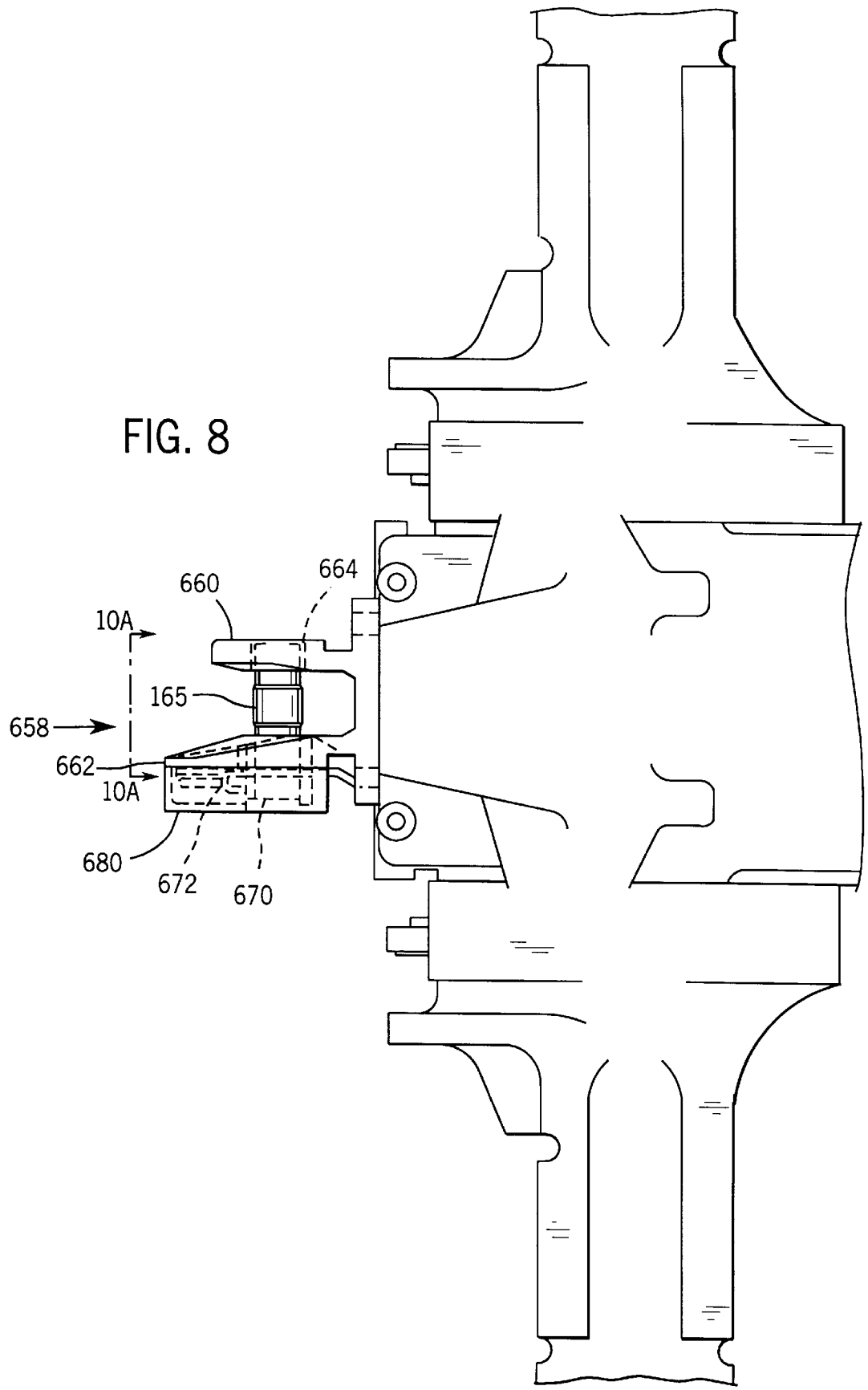
FIG. 8 is a fragmentary view in plan illustrating the details of an upper link bracket and a load pin of the assembly depicted in FIG. 7.
Figure 9:
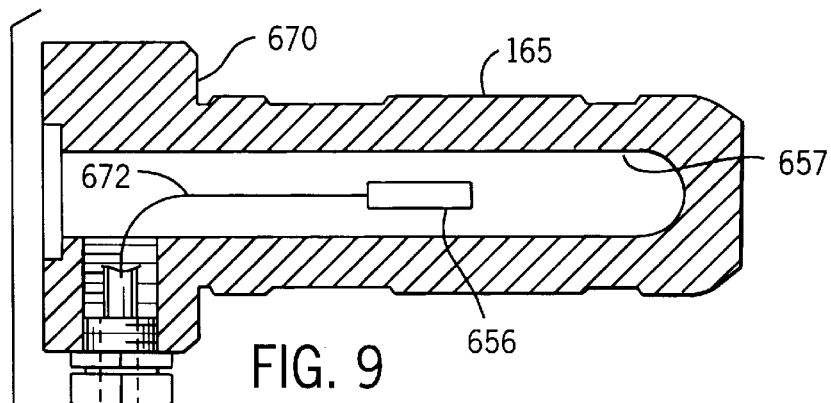
FIG. 9 is an enlarged, fragmentary cross sectional view in side elevation of the load pin depicted in FIGS. 6 and 7 and associated electrical conductor.
Figure 10A:
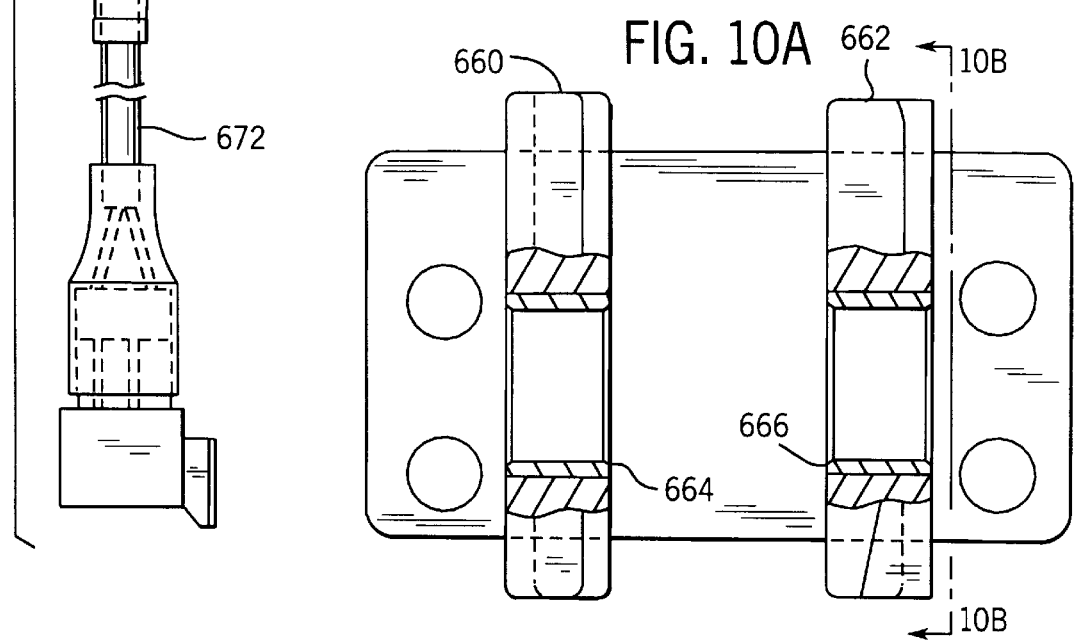
FIG. 10A is a fragmentary, front elevational view of an upper link bracket, with the load pin removed, and taken along Line 10A—10A of FIG. 8, which bracket may be utilized as a component of the assembly.
Figure 10B:
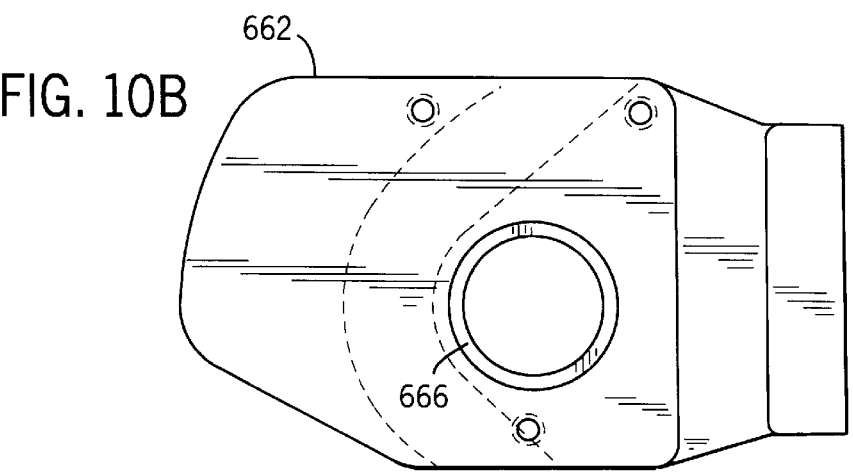
FIG. 10B is a side elevational view of the upper link bracket of FIG. 10A as viewed along Line 10B—10B of FIG. 10A and as if the pin holding portion was not fragmented.

Referring now to FIGS. 7, 8 and 9, load pin 165 is connected to tractor 10 at an upper arm bracket 658. Bracket 658 is shown most clearly in the plan view of FIG. 8 and includes a pair of spaced apart flanges 660 and 662, with pin 165 mounted therebetween and extending therethrough with its longitudinal axis substantially perpendicular to the longitudinal axis upper link arm 650 (FIG. 7). Flanges 660 and 662 may be bushed as at 664 and 666 (FIG. 10(a) and 10(b)) to eliminate or reduce wear on pin 165 if rotation occurs. Bushings 664 and 666 may be, by way of example only, approximately two millimeters in thickness and fabricated from steel, having a hardness of 55 to 60 Rockwell.

As best shown in FIG. 9, load pin 165 further includes a pin extension 670 which projects beyond the outer side of one of the flanges 660 and 662. As illustrated in FIGS. 8 and 9, pin extension 670 extends from the outer side of bracket flange 662 and rests against the outer side of that flange.

As shown in FIG. 9, an electronic strain on deformation sensor 656 is disposed within a chamber 657 of the pin. The strain or deformation sensors 656 and the sensors associated with load pins 265, may be composed of a number of commercially available strain gauges, for example, strain sensor part No. 1964916C3 from BLH Company. It is preferred that the strain sensor or gauge 656 be capable of measuring both positive and negative loads which correspond to tension and compression in the upper link arm 650a. Moreover, when the sensor 656 is employed with load pins 265, the positive and negative loads in arms 624a and 624b is also measured. Thus, sensor 656 is configured and oriented in pin 165, (and pins 265, if applicable) to generate a load signal which represents both tensile and compressive loads.

Referring once again to FIG. 9, the load signal, indicative of a positive or negative strain sensed by strain sensor 656, is conducted to the exterior of pin 165 as by a conductive wire and the like 672. As described heretofore, the load signal is applied to variable rate controllers 148 illustrated in FIG. 2. As will be discussed in more detail hereinafter, variable rate controllers 148 may use the load signals to develop control signals which are communicated to variable rate actuators 149 and controllers 148 may also communicate the load signal to DPU 116 which communicates the load signal information to memory card 114, for use in recording soil compaction conditions as discussed above.

Referring once again to FIGS. 7 and 8, a sealing cover 680 is disposed over and around pin extension 670 and wire 672 in order to retain the pin 165 and wire 672 from degradation due to the effects of dirt, water, oil and the like. The cover 680 presents movement of the wire 672 at the junction with pin extension 670 to inhibit fatigue failure of the wire at this junction. Cover 680 also operates to retain pins 165 in the bracket 658, while inhibiting rotation of the pin 165 therein. By maintaining pin 165 in a fixed orientation with respect to the bracket 658, the orientation of strain sensor 165 is also fixed to provide consistent load pin signals. Moreover, when multiple load pins are employed it is important to know the relative orientations of the load pins so that accurate calculations may be made of both the load magnitude and its direction. The cover 680 is shown in greater detail in FIGS. 11A and 11B.

Figure 11A:
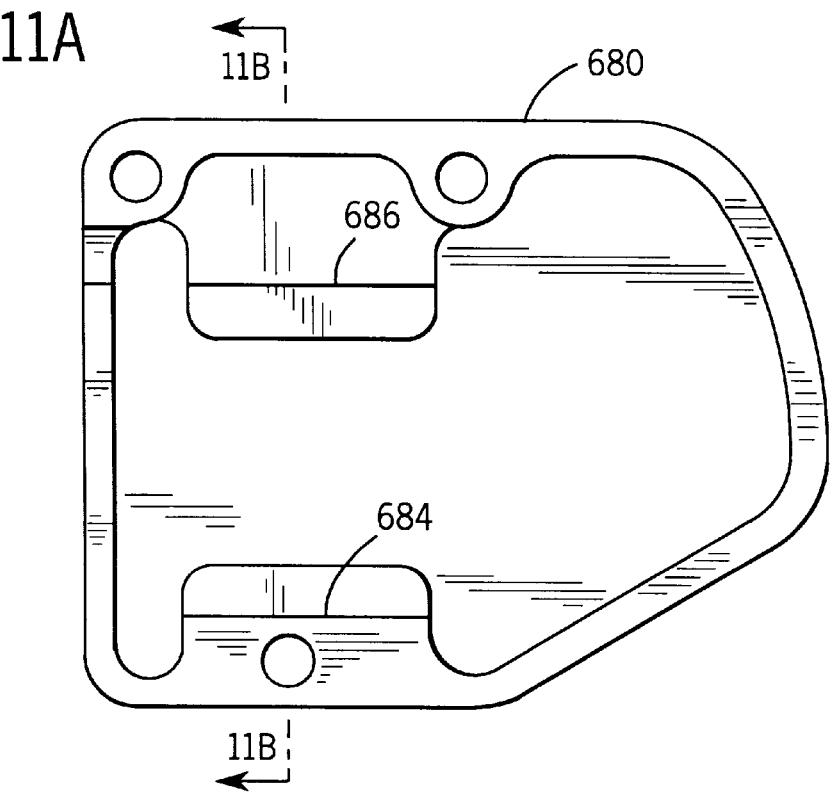
FIG. 11A is a schematic side elevational view illustrating the interior of a sealing cover of the load pin.
Figure 11B:
FIG. 11B is a cross-sectional view of the sealing cover of FIG. 11A taken along Line 11B—11B of FIG. 11A.

Referring now to FIGS. 11A and 11B, the cover 680 includes interior surfaces which provide a rotation stop for pin 165. In FIG. 11A, the rotation stop is shown as including at least two generally flat opposing surfaces 684 and 686 which are spaced apart so that two generally flat surfaces on pin extension 670 fit closely adjacent between opposing surfaces 684 and 686 of cover 680. Of course, other mechanical arrangements for effecting rotation stops may be utilized in lieu of the flat opposing surfaces described above and as shown in FIGS. 11A and 11B.

Figure 13:
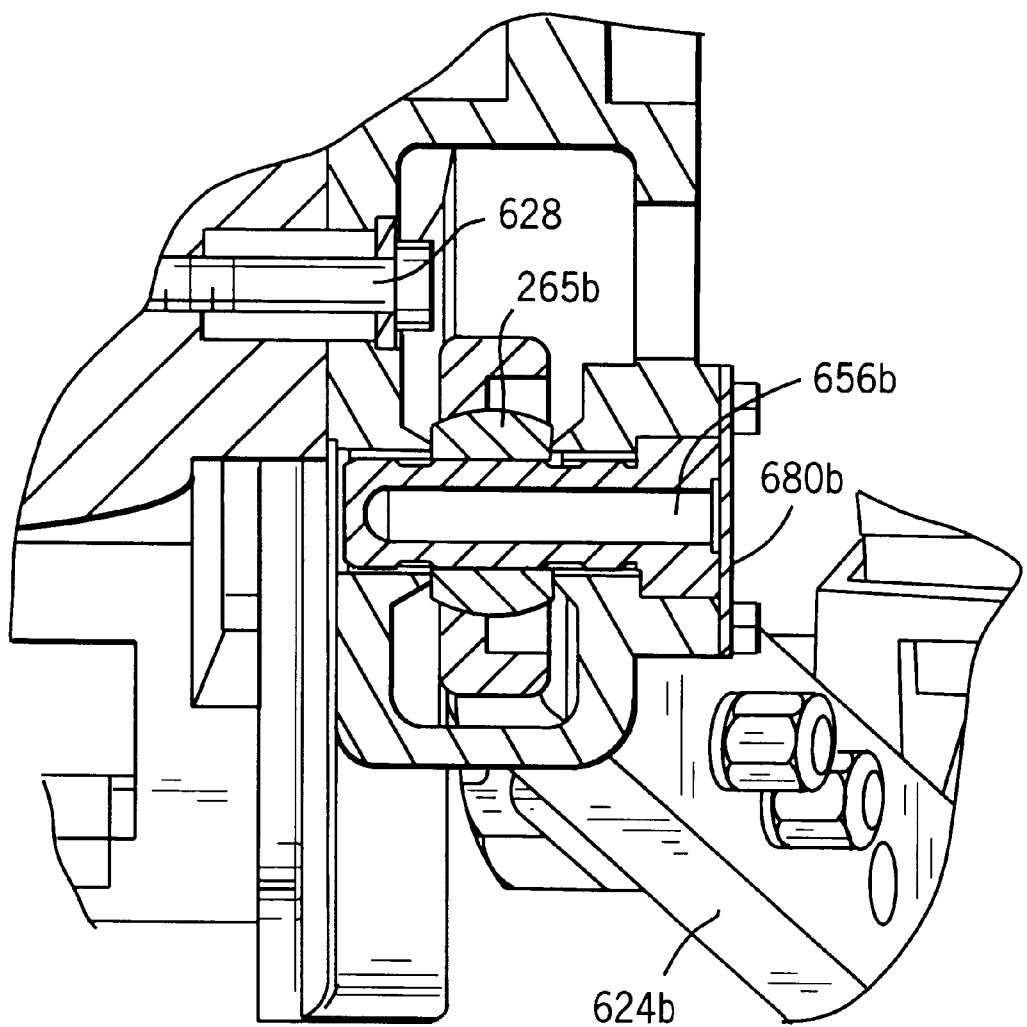
FIG. 13 is an enlarged view of one of the load measuring devices of FIG. 12.

In FIGS. 12 and 13, while the strain and deformation sensor 656a is shaped somewhat differently, its function and type (utilization of strain gauges and the like) may be similar to that employed in sensor 656 discussed above. Moreover, the cover 680a acts similarly to the sealing cover 68, above described.

The present pin and cover assembly is particularly advantageous for use with fully mounted, three point hitches, usable with ground gauging tools on the implements to permit lowering and raising of those ground engaging implements with respect to the ground. Moreover, the three point hitch provides three natural locations for mounting a set of three load pins 165 and 265, which allow both mode magnitude and load direction to be calculated.

Where it is desired to plot the force required to move a particular implement through a field at a particular location or plurality of locations as the implement moves along the field, it may be desirable to put load sensors on one or more of the tools carried by the implement so as to enable or facilitate plotting of the exact draft force at a particular location required to move that tool through the soil.

To this end, in referring now to FIGS. 15–19, a plurality of tools of different kinds are illustrated therein. For example, in FIGS. 15A and 15B two "S" tines 51 and 53, which are generally employed for secondary tillage operations as well as row crop cultivation, are provided with sensors 52 and 54, respectively, which may be wired back through the implement directly to the implement system 104 and the variable rate controllers 148.

In FIG. 16, a coil shank tool 55, which has an integral circular coil of material 55a as an integral part of the shank shape, provides a spring effect when the tool encounters obstructions in the soil. A load sensor such as a strain gauge 56 may be mounted along the shank as illustrated in FIG. 16, with suitable conductors once again leading back to the application sensors 150.

In the subsoiler ripper shank tool 57, illustrated in FIG. 17, which has a shape that permits working depths greater than that of heavy duty chisel shanks or other primary tillage implements, a strain gauge 58 is attached to the back of the ripper shank to permit accurate readings of the load required for moving that particular tool through the soil.

The chisel plow shank, which is of medium duty and shown at 60 in FIG. 18, includes a hydraulic cylinder and the like 61 to permit changing of the angle of the tip 62 of the chisel plow depending upon the feedback provided through or by way of the strain gauge 63 attached to the back side of the chisel plow or field cultivator shank. The strain gauge 63 provides signals to the variable rate controllers 148 which may send a signal by way of the variable rate actuators 149 to rotate the chisel plow shank into and out of engagement with the ground.

Still another chisel plow shank 64 is illustrated in FIG. 19, this chisel plow shank being of heavier duty than that shown in FIG. 16, but once again permitting of the application of a strain gauge 65 thereon to once again feedback information to the variable rate controllers 148 indicating the resistance met by the soil as applied to that working tool.

Thus, a plot of the field may be made indicating soil compaction at various tool locations mounted on the pulled implement, and the ease of moving tools through the soil to aid in more accurately locate where various farming materials should be applied to the soil.

It should be recognized that core system 102 may communicate with other vehicle systems over a vehicle data bus. Preferably the vehicle data bus conforms to the standards of SAEJ-1939 ("recommended practice for a serial control and a communications vehicle network"). A bridge circuit may be employed to facilitate the transfer of data between the vehicle data bus and a secondary implement bus coupled to implement system 104 and DPU 116. The bridge circuit, as is conventional, may be used to filter data between buses, thereby decreasing bus loading.

Figure 3:
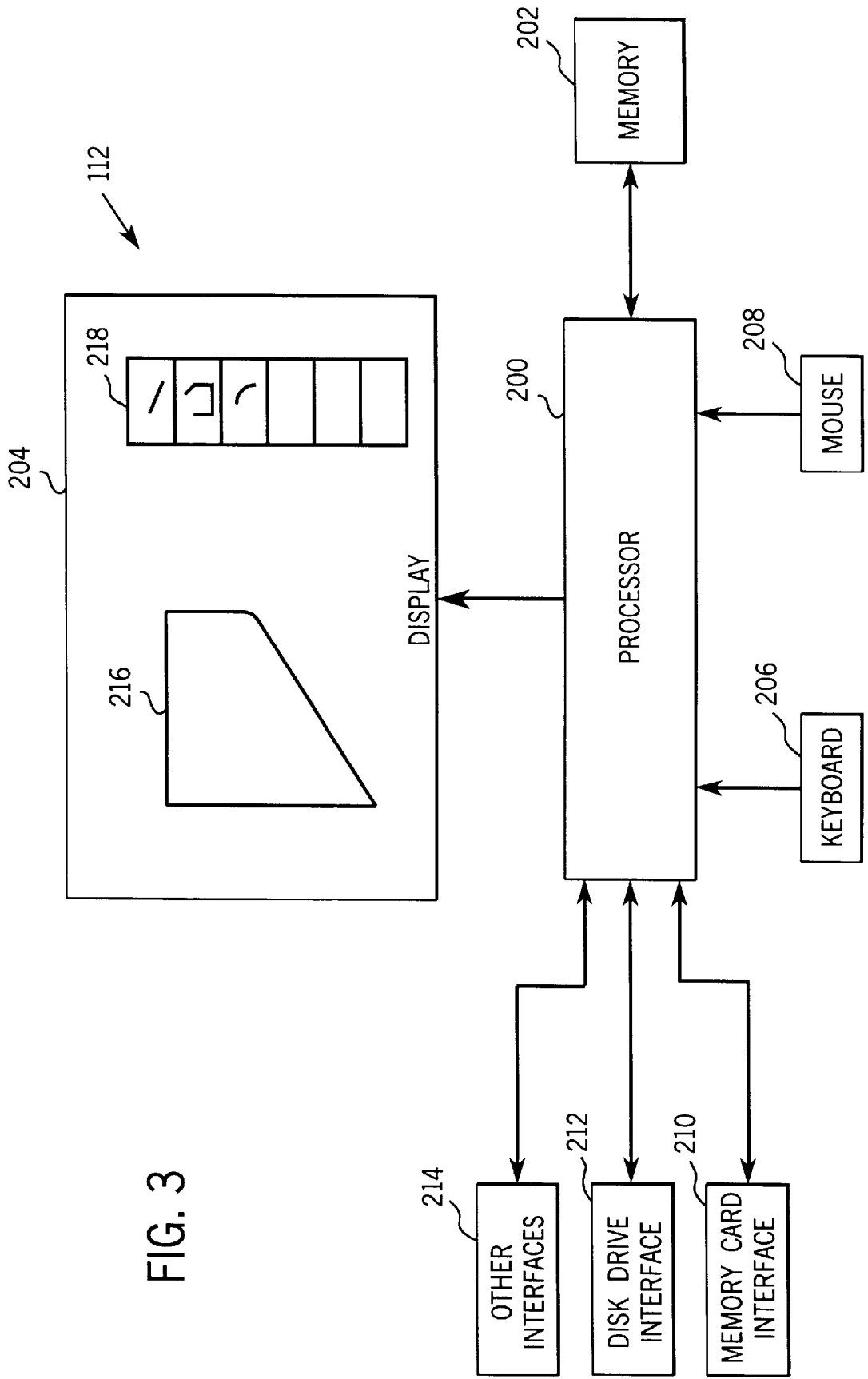
FIG. 3 is a block diagram of the computer illustrated in FIG. 2, which may be employed to process site-specific farming data.

Referring to FIG. 3, computer 112 is preferably a programmed personal computer including a processor 200, a memory circuit 202, a color or monochrome display 204, input devices such as a keyboard 206 or a mouse 208, and input/output interfaces such as memory card interface 210, a hard or floppy disk drive interface 212, and other interfaces 214 (e.g., RF or infrared). An input device such as a joystick, light pen or touch screen may also be employed. Alternatively, computer 112 may be implemented using dedicated specific-purpose equipment or hard-wired logic circuitry. Processor 200 may be an x86 or Pentium® microprocessor configured to execute a program stored in memory 202 or on a disk read by disk drive interface 212. Preferably, processor 200 reads precision farming data including position information from memory card 114 using memory card interface 210. Data may also be entered using keyboard 206, mouse 208, disk drive interface 212, or another interface 214.

Processor 200 generates display signals which, when applied to display 204 (which includes basic video drive circuitry, e.g. VGA circuitry), cause visual alpha-numeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 4:
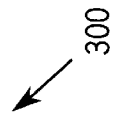
FIG. 4 is a table representing spatially-variable data illustrating the loads as detected by, for example, hitch load pins, which data may be stored in memory.

FIG. 4 generally represents the structure in which a layer of site-specific farming data representative of force applied to an implement by the soil, in a farming field, is stored in memory. The data structure may be referred to as a georeferenced digital map, or a layer of data. The structure is preferably implemented using a database 300 (e.g., a geographical information system (GIS) database) represented by a table, wherein each row represents a data point taken at a location in the field. For example, a layer having 5000 data points is represented by a table having 5000 rows. Columns of information are associated with each data point. For example, the columns shown in FIG. 4 include load pin data, and the longitude and latitude coordinates at which each data point was sampled. The data structure of FIG. 4 represents, for example, a soil compaction layer. Data in the first row (data point No. 1) indicates that load pins sensed a resultant force of 1053.3 lbs., derived from the orthogonal components of the loads sensed by load pin 1 (165a) (225.8 lbs), load pin 2 (265a) (351.6 lbs) and load pin 3 (265b) (572.3 lbs), at a location defined by longitude and latitude coordinates −88.7291520 and 39.0710720. A layer like this may also include a column for a calculated value for the soil compaction or hardness at the specific location, based on the load pin measurements.

A similar structure may be used to store each layer of site-specific farming data. For example a pH layer may include a row for each data point and columns for pH, longitude and latitude. Thus, memory card 114 may contain a layer of data for each site-specific characteristic of a field. The data structure may also include heading information such as vehicle identifier, a farm identifier, a field identifier, a load identifier, and a serial number for hardware components of farming system 100 (e.g., a yield module serial number, or a hitch serial number). A similar data structure is used to store harvest data as well as application data. The harvest and application data are preferably stored as files in memory card 114.

DPU 116 and processor 200 use force data and correlated location data to perform various functions of site-specific farming system 100. For example, DPU 116 or processor 200 use the correlated farming data to generate display signals which cause electronic display 128 or 204, respectively, to plot a map of a field which includes visible indicia of the soil condition or force data. DPU 116 typically plots the map in real time as the force and location signals are received from the sensing circuits (e.g., load sensors, or other application sensors 150) and from location signal generation circuit 138, respectively. However, DPU 116 may also plot a map off-line based upon farming data previously stored in memory. For example, if an application operation was stopped in mid-field on a previous day, DPU 116 may generate a soil condition map based on the previous day's force data and continue plotting data on the soil condition map that is collected during the current day's operation. In contrast, processor 200 typically plots the map off-line based upon farming data received from memory card 114.

Figure 5:
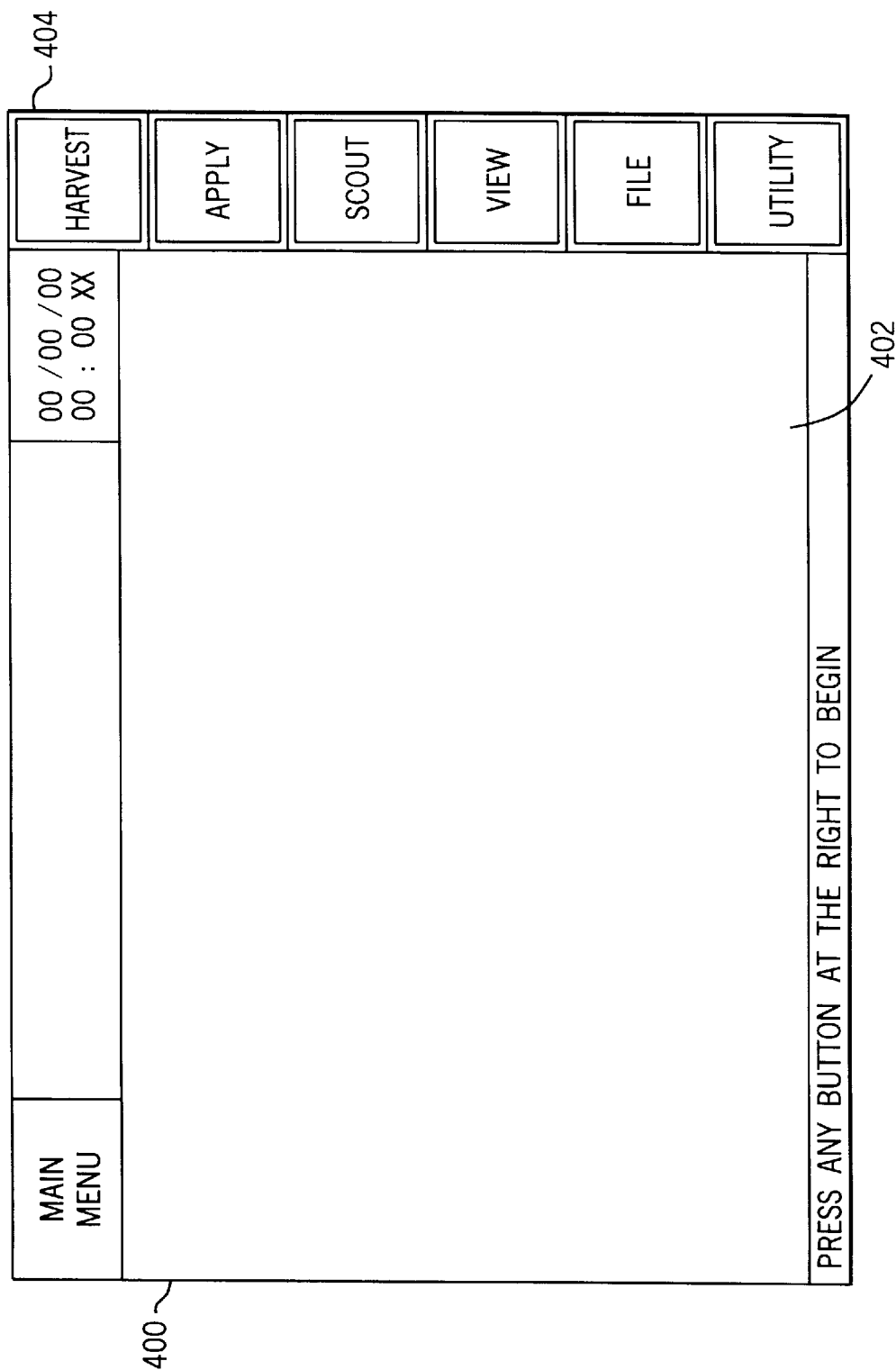
FIG. 5 is a main menu screen on the electronic display of FIG. 3 when power is supplied to the site-specific farming system.

Site-specific farming system 100 operates in one of several modes selected by the operator. Referring to FIG. 5, DPU 116 generates display signals after power is applied to farming system 100 which cause display 128 to display a main menu screen in the vehicle cab. The screen 400 of display 128 includes a map display area 402 which displays an introductory message (not shown) and a graphical operator interface 404 which shows the initial configuration of assignable switches 124. On power up, the switches are assigned functions which correspond to the operating modes of DPU 116 including HARVEST, APPLY, SCOUT and alternatively DATA COLLECTION (not shown). DPU 116 reads signals generated in response to operator actuation of one of the switches 124, decodes the signals, and enters the selected mode of operation.

Figure 6:
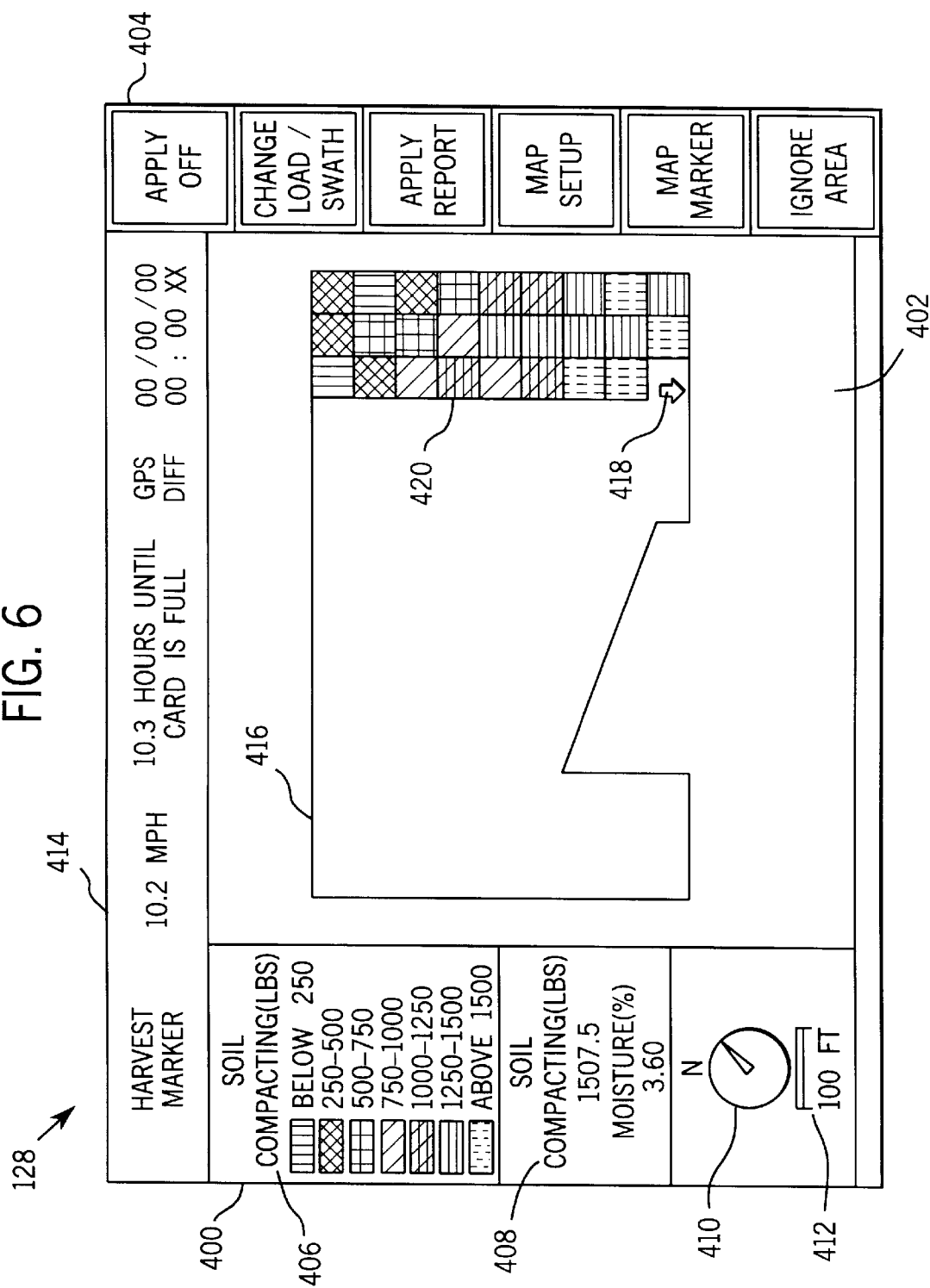
FIG. 6 is an application screen on the electronic display of FIG. 3 which includes a map of a field, visible indicia of soil compaction and visible indicia illustrating the definitions of a plurality of redefinable switches when configured for applying field inputs.

When farming system 100 is in position to provide farming inputs to a field, the switch 124 corresponding to APPLY in FIG. 5 is actuated. In response, DPU 116 enters into apply mode and generates display signals which cause display 128 to show an apply screen as depicted in FIG. 5. As application of farming inputs begins, force data and correlated location data are gathered and used to generate display signals causing display 128 to plot a map of the field in map display area 402 including visible indicia of the soil condition, such as soil compaction. DPU 116 also changes the configuration of switches 124, and generates display signals causing operator interface 404 to generate visible indicia showing the new states or configurations of switches 124. As shown in FIG. 6, assignable switches 124 have been re-defined to generate input signals which relate to applying field inputs (e.g., "APPLY OFF", "CHANGE LOAD/SWATH", "APPLY REPORT").

The display signals also cause display 128 to show a legend block 406, a status block 408 for displaying statistical data (e.g., average soil compaction measurement and soil moisture content) of the field, a compass indicator 410 to show the heading of the vehicle, a map scale 412, and a status line 414 for displaying status information such as the operating mode ("HARVEST", "APPLY", "DATA COLLECTION" or "SCOUT"), the vehicle speed, time remaining until memory card 114 is full, GPS and DGPS status (e.g., good or bad) and date/time. The graphical symbols and their positions within screen 400 are shown for illustration only and may be modified. For example, map display area 402 may cover any portion or all of screen 400 with other displayed information superimposed or suppressed if necessary.

FIG. 6 represents an exemplary display when core system 102 is mounted on a tractor equipped with hitch load pins 165 and other application sensors 150, including a moisture sensor, and the tractor is applying field inputs. In this example, the boundaries of the field being worked are defined and are stored in memory. After entering the apply mode of operation, in response to actuation of one of assignable switches 124, DPU 116 accesses the longitude and latitude coordinates of the field boundary from memory and scales the field boundary to substantially correspond to a portion of map display area 402. DPU 116 scales the boundary data and produces display signals which, when applied to display 128, generate a visible map 416 of the field within the portion of the map display area 402. The portion of map display area 402 which is used to display map 416 may be 80% or 90% of the size of map display area 402, with the percentage selected to enhance the visual appearance of map 416. However, any percentage value may be used which provides a desirable appearance, including 100%, and the percentage may be set by the user. The scale of map 416 is displayed at map scale 412 (e.g. 100 ft/inch).

At the start of the plowing process, the tractor 10 was located at the upper-right hand corner of map 416. The tractor then made a number of passes through the field, turning at the headlands (located at the boundaries of map 416). The current location of the tractor is marked by an icon 418, such as an arrow which also indicates the direction of travel which may be determined from changes in the location data. Other icons may be used (e.g., a drawing of a tractor). Throughout the plowing process, DPU 116 gathers site-specific data sensed by hitch load pins 111 and other application sensors 150 and correlates the sensed data with the locations at which the sensed data was sampled using signals from location signal generation circuit 138. The data may be sampled, for example, at 1 second intervals. The correlated data is stored in memory (e.g., memory card 114) for later analysis by office computer 112. DPU 116 may be configured to not calculate soil condition data based upon an indication that the tractor is not applying field inputs (e.g., plow position is above a threshold position).

DPU 116 provides an indication of the time remaining before memory card 114 is filled up by soil condition data during "APPLY" mode, or by yield data during "HARVEST" mode when core system 102 is on a combine. The time remaining equals the amount of memory currently free multiplied by the time since the start of application or harvesting, divided by the difference between the amount of memory free at the start and the amount of memory currently free. The result of the calculation is displayed in status line 414 (e.g., "10.3 Hours Until Card is Full"). Alternatively, DPU 116 may display the portion or percentage of memory card 114 that is filled up.

DPU 116 may also provide an indication of the estimated time remaining until sampling of the field is complete (i.e., estimated time to complete application or harvesting). The estimated time to complete equals the time since the start of application or harvesting multiplied by the difference between the area of map 416 within the boundaries and the area worked, divided by the area worked. The result is displayed on display 128 (e.g., "Estimated Time to Complete is 3.5 Hours"). Alternatively, DPU 116 may display the portion or percentage of the field that has been harvested.

To accurately correlate location data with sensed force data, DPU 116 is preferably programmed with variables, which may be set by the operator, which indicate the distance and direction between GPS antenna 142 and the sampled location of the field (i.e., between antenna 142 and the combine's header or the tractor's implement). This information is used as an offset to correct the location data stored with the sensed data. In one embodiment, DPU 116 maintains a buffer of the last 20 locations received, and selects a location to use based upon the delay value. The force data and correlated location data are used to produce a display signal in real-time which, when applied to display 128, generates visible indicia of the soil condition at corresponding locations of map 416. DPU 116 gathers force data over "square" areas of the field where the sides of the square are substantially equal to the width of cut of the plow (or the width of the cut of the combine). Other shapes or blocks could also be used such as rectangles where the width is equal to the width of cut and the length is equal to the distance traversed in some time interval. Data within each block is automatically processed or filtered (e.g., averaged). Averaging data as it is plotted eliminates the need to plot every data point, thereby decreasing visual noise on display 128. If desired, the blocks of data could be stored in memory rather than the raw data to reduce the memory storage and subsequent processing requirements. The average value of the data in each block, and location data associated with the block (appropriately scaled), are used to produce the display signal applied to display 128. In response, display 128 generates visible blocks 420 which include visible indicia of the average soil condition value at corresponding locations of map 416.

Soil Condition data may be visually represented on display 128 in several ways. In a preferred embodiment, distinguishable colors represent different ranges of the average data in each visible block. For example, the colors red, orange, yellow, green, cyan, blue and violet may represent increasing ranges of average resultant load, average soil compaction, or average soil hardness. Legend 406 displays each color and its associated yield range: below 250 (red); 250–500 (orange); 500–750 (yellow); 750–1000 (green); 1000–1250 (cyan); 1250–1500 (blue); and above 1500 pounds of force sensed in the hitch load pins (violet). The ranges and colors are not limited to this configuration. Further, the range and color schemes can be either automatically selected or can be manually selectable by the user. Alternatively, ranges may be represented by alpha-numeric characters or by different light intensity levels or by grey scales.

Graphical operator interface 404 includes a label which shows the assignment currently selected for each switch 124. The label and assignment depend on the mode of operation of DPU 116. Indicator 410 is an electronic compass which shows the current direction or heading of the vehicle with respect to north (e.g., northeast in FIG. 5). DPU 116 may calculate the heading based on a vector from the previous location of the vehicle to the current location. Appropriate filtering should be used to keep the compass from changing direction due to GPS errors when the vehicle is not moving. Alternatively, the vehicle may be equipped with a compass or gyroscope electronically interfaced with DPU 116. In FIG. 5, the orientation of the display shows the vehicle going up and down as it travels northeast. However, the orientation of the display could also be geographic (e.g., north up).

In FIG. 6, status line 414 displays "APPLY" to indicate that DPU 116 is operating in "apply" mode, and operator interface 404 indicates that assignable or redefinable switches 124 are configured to generate input signals relating to application (e.g., "APPLY OFF", "CHANGE LOAD/SWATH", "APPLY REPORT"). However, when core system 102 is mounted on a combine and is operating in "harvest mode", status line 414 shows "HARVEST" and operator interface 404 indicates that re-definable switches 124 are configured to generate input signals relating to harvesting (e.g., "HARVEST OFF", "CHANGE LOAD/SWATH", "HARVEST REPORT").

Preferably, DPU 116, display 128 and switches 124 are packaged in an integrated assembly such that display 128 provides labels showing assignments of switches 124. However, switches 124 could be housed in a keyboard external to housing assembly of DPU 116.

While the embodiments illustrated in the drawings and described above are presently preferred, it should be understood that these embodiments are offered by way of example only. For example, voice-communication interface 126 can be used to generate command signals instead of switches 124 to further simplify the operator interface by allowing an operator to issue a command by speaking its name (e.g., "apply"). The invention is not intended to be limited to any particular embodiment, but is intended to extend to various modifications that nevertheless fall within the scope of the appended claims.

What is claimed is:

1. A system for recording soil conditions of an agricultural field while work is being performed on the field, the system comprising:
   a vehicle moveable over the field;
   an agricultural tool moveable by the vehicle, with a force, and configured to perform work on the field as the vehicle moves over the field;
   an input device supported by the vehicle and configured to generate force signals representative of the force applied by the soil to the tool during the work operations;
   a location signal generation circuit supported by the vehicle and configured to receive first location signals and to generate second location signals therefrom;
   a control element, coupled to the input device and the location signal generation circuit, the control element configured to generate condition data representative of the soil conditions based upon the force signals, and to process the second location signals to generate location data representative of the corresponding location of the vehicle in the field; and
   a digital memory coupled to the control element, the control element further configured to correlate the condition data with the respective location data, and to store the condition data with the correlated location data in the digital memory.

2. The system of claim 1, wherein the system includes a sensing circuit supported by the vehicle and configured to generate characteristic signals representative of the work performed by the tool at a plurality of locations within the field.

3. The system of claim 1, wherein the input device comprises at least one load pin configured to generate the force signals.

4. The apparatus of claim 3, wherein the load pin includes an electronic strain sensor configured to sense and measure tensile and compressive loads in the pin.

5. The system of claim 1, wherein the location signal generation circuit receives global positioning system (GPS) signals and generates the second location signals based on the GPS signals.

6. The system of claim 5, wherein the location signal generation circuit receives differential global positioning system (DGPS) signals and generates the second location signals based on the GPS and DGPS signals.

7. The system of claim 1, wherein the location signal generation circuit includes an antenna for receiving the first location signals, and the control element applies an offset signal when generating the location data to correct for the separation between the tool and the antenna.

8. The system of claim 1, wherein the vehicle is a tractor and the tool is a variable-rate applicator configured to apply a farming input to the field.

9. The system of claim 1, wherein the tool is supported by a three point hitch on the vehicle.

10. The system of claim 9, wherein the input device includes three load pins configured to generate the force signals.

11. The system of claim 1, wherein the condition data generated is soil compaction data.

12. An apparatus for recording soil conditions of an agricultural field while work is being performed on the field, the apparatus comprising:
    a vehicle moveable over the field;
    a hitch, for attachment of a ground-engaging implement, the hitch including
        at least one link arm, having a first end and a second end, wherein the first end is attachable to the rear of the vehicle, and wherein the second end is attachable to the ground-engaging implement, and
        at least one load pin configured to generate force signals representative of the force applied thereto;
    a location signal generation circuit supported by the vehicle and configured to receive first location signals and to generate second location signals therefrom;
    a control element coupled to the at least one load pin, and the location signal generation circuit, the control element configured to generate condition data representative of the soil conditions based upon the force signals, and to process the second location signals to generate location data representative of the corresponding location of the vehicle in the field; and
    a digital memory coupled to the control element, the control element further configured to correlate the condition data with the respective location data, and to store the condition data with the correlated location data in the digital memory.

13. The apparatus of claim 12, wherein the hitch is a three point hitch including three load pins.

14. The apparatus of claim 12, wherein the load pins each include an electronic strain sensor configured to sense and measure tensile and compressive loads in the respective pin.

15. The apparatus of claim 12, wherein the hitch includes at least one lift arm, for raising and lowering of a ground-engaging implement, each lift arm having a first end and a second end, wherein the first end is attachable to the rear of the tractor and the second end is attachable to the respective link arm.

16. The apparatus of claim 12, wherein the location signal generation circuit receives global positioning system (GPS) signals and generates the second location signals based on the GPS signals.

17. The apparatus of claim 16, wherein the location signal generation circuit receives differential global positioning system (DGPS) signals and generates the second location signals based on the GPS and DGPS signals.

18. The apparatus of claim 12, wherein the location signal generation circuit includes an antenna for receiving the first location signals, and the control element applies an offset signal when generating the location data to correct for the separation between the tool and the antenna.

19. A method of recording soil conditions in an agricultural field while work is being performed on the field by a tool supported by a vehicle moving over the field, comprising the steps of:

generating force data representative of soil conditions at a plurality of locations within the field;

receiving location signals;

processing the location signals to generate location data representative of the plurality of locations;

correlating the respective location data with the respective condition data; and storing the location data with the correlated condition data.

20. The method of claim 19, further comprising the step of engaging the tool with the soil while generating the condition data, wherein the condition data is generated from a signal representative of the forces applied by the soil to the tool.

21. A system for recording soil conditions of an agricultural field while work is being performed on the field, the system comprising:

a vehicle moveable over the agricultural field;

an implement towing assembly mounted on the vehicle;

an agricultural implement coupled to the implement towing assembly for movement by the vehicle, the agricultural implement including a plurality of soil engaging tools configured to engage the soil of the field as the vehicle moves over the field;

a force sensor assembly coupled to the implement towing assembly, the force sensor assembly configured to generate force signals representative of the forces applied by the agricultural implement on the vehicle, the force signals representing the composite forces being applied by the plurality of soil engaging tools on the implement;

a location signal generation circuit supported by the vehicle and configured to receive first location signals and to generate second location signals therefrom;

a control element, coupled to the force sensor assembly and the location signal generation circuit, the control element configured to generate condition data representative of the soil conditions based upon the force signals, and to process the second location signals to generate location data representative of the corresponding location of the vehicle in the field; and a digital memory coupled to the control element, the control element further configured to correlate the condition data with the respective location data, and to store the condition data with the correlated location data in the digital memory.

22. The system of claim 21, wherein the implement towing assembly includes a three-point hitch.

23. The system of claim 22, wherein the force sensor assembly includes at least one force measuring pin coupled to the three-point hitch.

24. The system of claim 23, wherein the force sensor assembly includes a plurality of force measuring pins coupled to the three-point-hitch.

25. The system of claim 21, wherein the implement towing assembly includes a drawbar.

26. The system of claim 25, wherein the force sensor assembly includes a sensing element mounted on the drawbar.

* * * * *